(12) United States Patent
Tseng et al.

(10) Patent No.: US 12,048,975 B2
(45) Date of Patent: Jul. 30, 2024

(54) SLIDING TABLE DEVICE

(71) Applicant: TOYO AUTOMATION CO., LTD., Tainan (TW)

(72) Inventors: Kun-Cheng Tseng, Tainan (TW); Wen-Chih Hung, Tainan (TW)

(73) Assignee: TOYO AUTOMATION CO., LTD., Tainan (TW)

(*) Notice: Subject to any disclaimer, the term of this patent is extended or adjusted under 35 U.S.C. 154(b) by 159 days.

(21) Appl. No.: 18/052,274

(22) Filed: Nov. 3, 2022

(65) Prior Publication Data
US 2024/0058909 A1 Feb. 22, 2024

(30) Foreign Application Priority Data
Aug. 16, 2022 (TW) .................................. 111130803

(51) Int. Cl.
| | |
|---|---|
| *B23Q 1/56* | (2006.01) |
| *B23Q 1/01* | (2006.01) |
| *B23Q 11/10* | (2006.01) |

(52) U.S. Cl.
CPC ............. *B23Q 1/56* (2013.01); *B23Q 11/10* (2013.01); *B23Q 1/015* (2013.01)

(58) Field of Classification Search
CPC ........... B23Q 1/56; B23Q 1/015; B23Q 11/10
See application file for complete search history.

(56) References Cited

U.S. PATENT DOCUMENTS

| | | | | |
|---|---|---|---|---|
| 4,867,620 A | * | 9/1989 | Newman ................ | B23Q 11/10 409/134 |
| 2008/0116038 A1 | * | 5/2008 | Chen ..................... | F16C 33/506 198/469.1 |
| 2008/0232727 A1 | * | 9/2008 | Hsu ..................... | F16C 29/0609 384/49 |
| 2012/0090437 A1 | * | 4/2012 | Monroe ................ | B23Q 1/015 82/149 |
| 2022/0346546 A1 | * | 11/2022 | Tseng ..................... | F16C 29/065 |
| 2023/0022366 A1 | * | 1/2023 | Tseng .................. | F16H 25/2247 |
| 2023/0091764 A1 | * | 3/2023 | Tooyama ................. | B23Q 1/25 408/199 |
| 2023/0173626 A1 | * | 6/2023 | Doi ........................ | B23Q 11/10 173/197 |

* cited by examiner

*Primary Examiner* — Daniel J Rohrhoff
(74) *Attorney, Agent, or Firm* — MLO, a professional corp.

(57) ABSTRACT

A sliding table device includes a base unit, a sliding unit and a cover plate. The sliding unit includes two rails, two sliding blocks disposed respectively and slidably on the rails and each having an oil inlet, and a sliding seat mounted co-movably on the sliding blocks. The sliding seat includes a main portion having a flow passage and an insertion hole that interconnects the flow passage and external environment, two fixed portions mounted respectively to the sliding blocks and each having a connecting passage that communicates with the flow passage, and two guiding portions formed respectively on the fixed portions and each having a guiding passage that communicates with the corresponding connecting passage and the corresponding oil inlet. The cover plate covers a portion of the main portion, and the insertion hole is not covered by the cover plate.

7 Claims, 7 Drawing Sheets

SLIDING TABLE DEVICE

CROSS-REFERENCE TO RELATED APPLICATION

This application claims priority to Taiwanese Invention Patent Application No. 111130803, filed on Aug. 16, 2022.

FIELD

The disclosure relates to an equipment to be mounted on a machine bed, and more particularly to a sliding table device.

BACKGROUND

A conventional multi-mover sliding table module, e.g., as disclosed in Chinese Patent Application Publication No. 113315303A, includes a base, two spaced-apart rails disposed on the base, two sliding units slidably disposed on the slide rails, and a protective cover plate mounted on a top portion of the base and covering the base and the sliding units. Each of the sliding units includes a plurality of sliding block sets disposed on the slide rails, and a sliding seat mounted on the sliding block sets.

Taiwanese Patent Application Publication No. 202126925A discloses a sliding block set that has a structure similar to that of the abovementioned sliding block sets disclosed in Chinese Patent Application Publication No. 113315303A. The sliding block set includes a sliding block, and two end caps disposed at two opposite ends of the sliding block. The sliding block set includes a plurality of rolling members accommodated in and circulating along a circulation groove that extends in the sliding block and the end caps, so that the sliding block set is slidable on the rails. Each of the end caps is formed with an oil inlet that is in fluid communication with the circulating groove and external environment, and that functions to allow injection of lubricating oil into the end cap to lubricate the rolling members for maintenance of a corresponding sliding block. In addition, the sliding block set may further be equipped with a sealing member to prevent foreign objects or foreign matter from entering the oil inlet.

However, when performing daily maintenance on the conventional multi-mover sliding table module, the protective cover plate and the sealing members have to be removed first, so that the oil inlet of each of the end caps may be exposed to the external environment, then an oil gun may be brought to inject lubricating oil into the oil inlet; the entire process is troublesome. In a case where the oil gun is not properly aligned with the oil inlet, the lubricating oil may undesirably be sprayed on other components of the sliding table module, thus adversely affecting operation of a machine bed mounted with the conventional multi-mover sliding table module.

SUMMARY

Therefore, an object of the disclosure is to provide a sliding table device that can alleviate at least one of the drawbacks of the prior art.

According to the disclosure, a sliding table device includes a base unit, a sliding unit and a cover plate. The base unit extends in a longitudinal direction. The sliding unit includes two rails, two sliding blocks and a sliding seat. The rails extend in the longitudinal direction, are disposed on the base unit, and are spaced apart from each other in a transverse direction perpendicular to the longitudinal direction. The sliding blocks are disposed respectively and slidably on the rails. Each of the sliding blocks has at least one oil inlet. The sliding seat is mounted co-movably on the sliding blocks, and includes a main body portion, two fixed portions and two guiding portions. The main body portion has a main flow passage that is adapted to be in fluid communication with external environment. The fixed portions extend downwardly from the main body portion and are mounted respectively to the sliding blocks. Each of the fixed portions has a connecting passage that is in fluid communication with the main flow passage. The guiding portions are formed respectively on the fixed portions and abut respectively against the sliding blocks. Each of the guiding portions has a guiding passage that is in fluid communication with the connecting passage of the respective one of the fixed portions and the at least one oil inlet of the respective one of the sliding blocks. The cover plate extends in the longitudinal direction, is disposed above the base unit, and covers a portion of the main body portion. The main body portion further has an insertion hole that is formed in an outer surface thereof, that is not covered by the cover plate, and that is adapted for interconnecting the main flow passage and the external environment.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
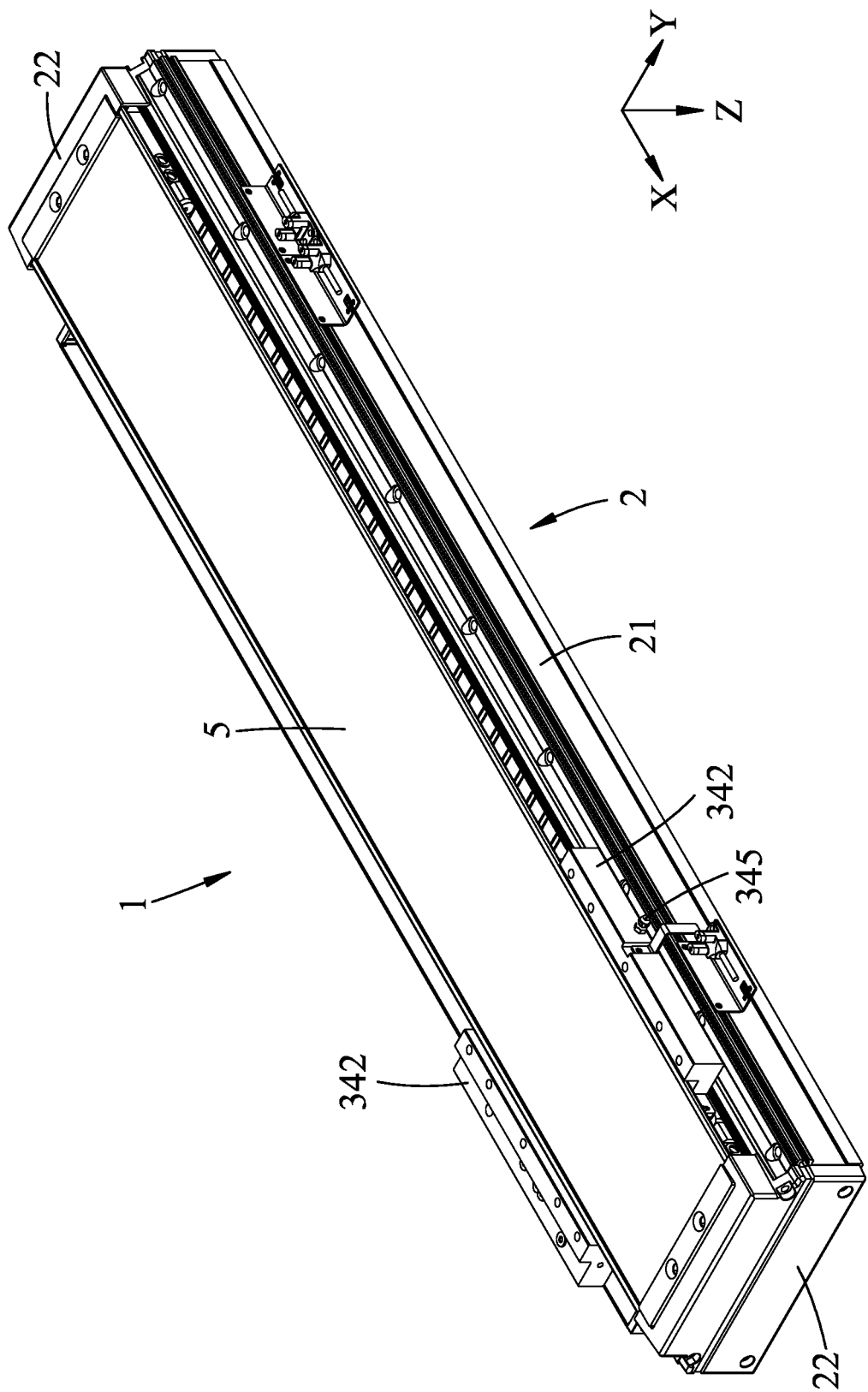
FIG. 1 is a perspective view of a sliding table device according to an embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
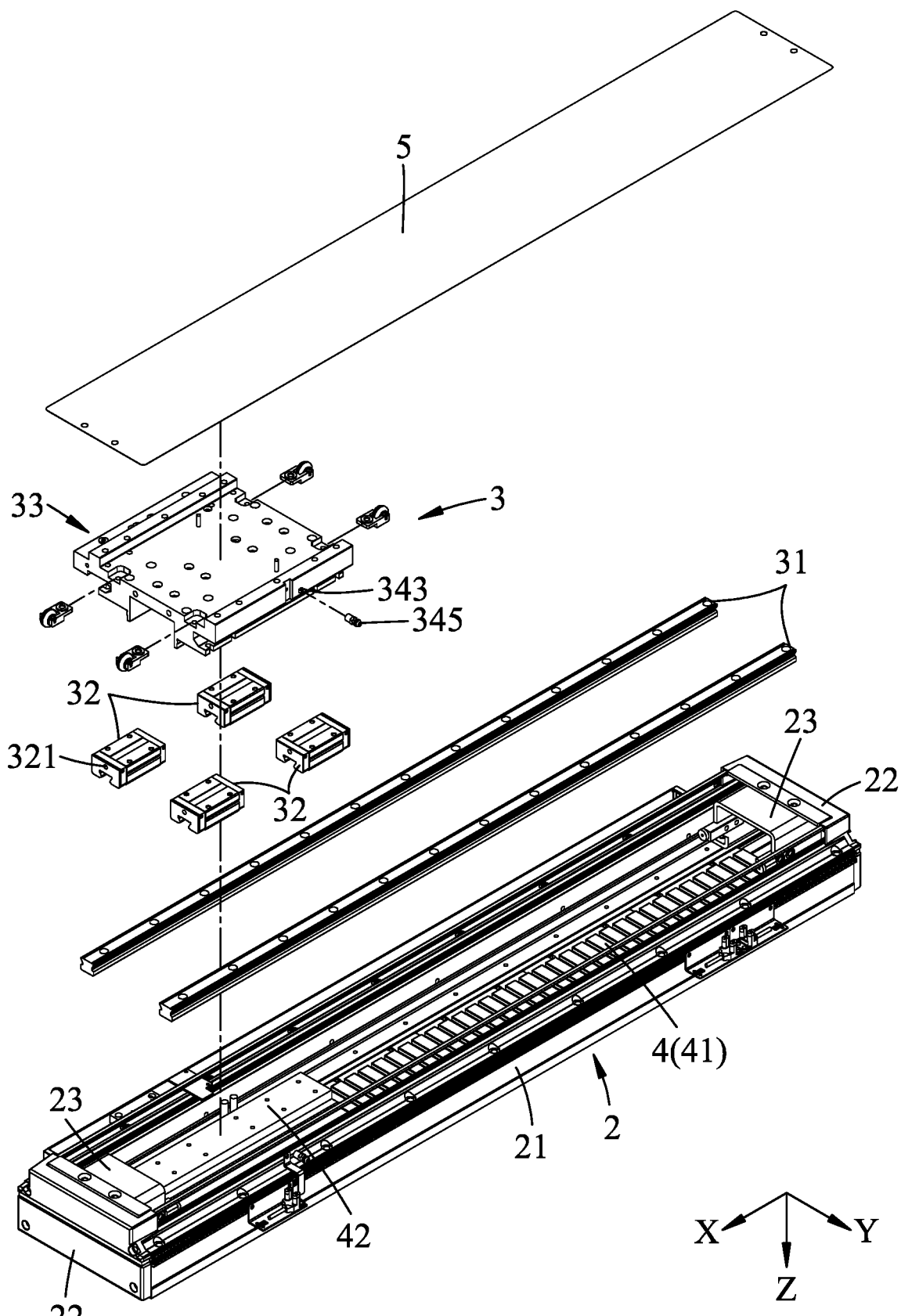
FIG. 2 is a partly exploded perspective view of the embodiment.
Figure 3:
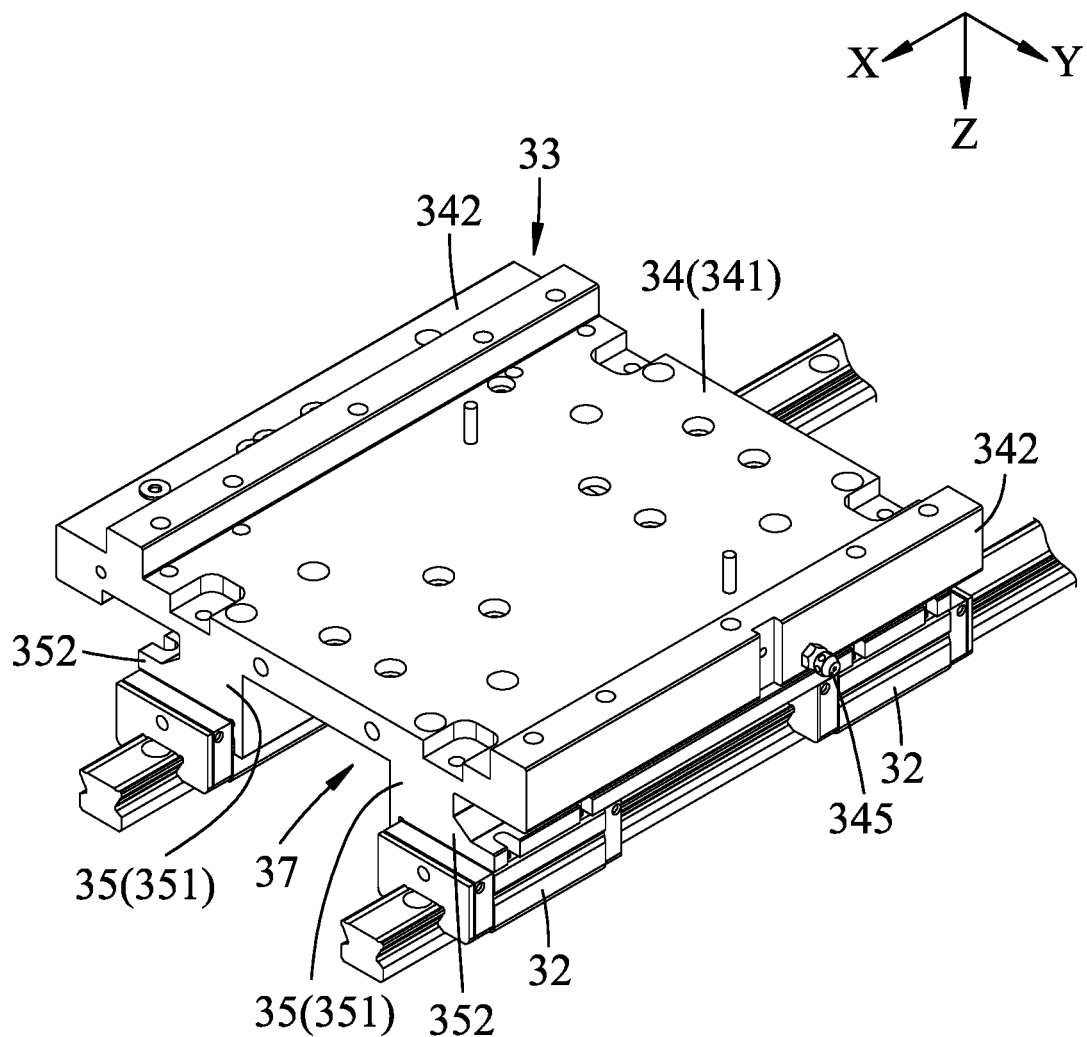
FIG. 3 is a fragmentary perspective view of a sliding unit of the embodiment.

Referring to FIG. 1 to FIG. 3, an embodiment of a sliding table device 1 of the present disclosure includes a base unit 2, a sliding unit 3, a linear motor unit 4 and a cover plate 5.

The base unit 2 includes a base body 21 extending along a longitudinal direction (X), two end seats 22 disposed respectively at two ends of the base body 21 that are opposite in the longitudinal direction (X), and two buffering modules 23 mounted to the base body 21 and disposed respectively adjacent to the end seats 22.

The sliding unit 3 includes two rails 31, two pairs of sliding blocks 32 and a sliding seat 33. The rails 31 extend in the longitudinal direction (X), are disposed on the base body 21, and are spaced apart from each other in a transverse direction (Y) perpendicular to the longitudinal direction (X). One pair of the sliding blocks 32 is slidably disposed on one of the rails 31, and the other pair of the sliding blocks 32 is slidably disposed on the other one of the rails 31. The sliding seat 33 is mounted co-movably on the sliding blocks 32 and is thus slidable along the rails 31. During movement of the sliding seat 33 along the rails 31, the buffering modules 23 mounted to the base body 21 are for buffering collision between the sliding seat 33 and the end seats 22.

Each of the sliding blocks 32 has two oil inlets 321 (see FIGS. 4 and 7) formed respectively at two ends thereof that are opposite in the longitudinal direction (X), and a circulating groove (not shown) that is in fluid communication with the oil inlets 321 and that is mounted with a plurality of rolling members (not shown) to facilitate movement of the sliding blocks 32 on the rails 31.

Figure 4:
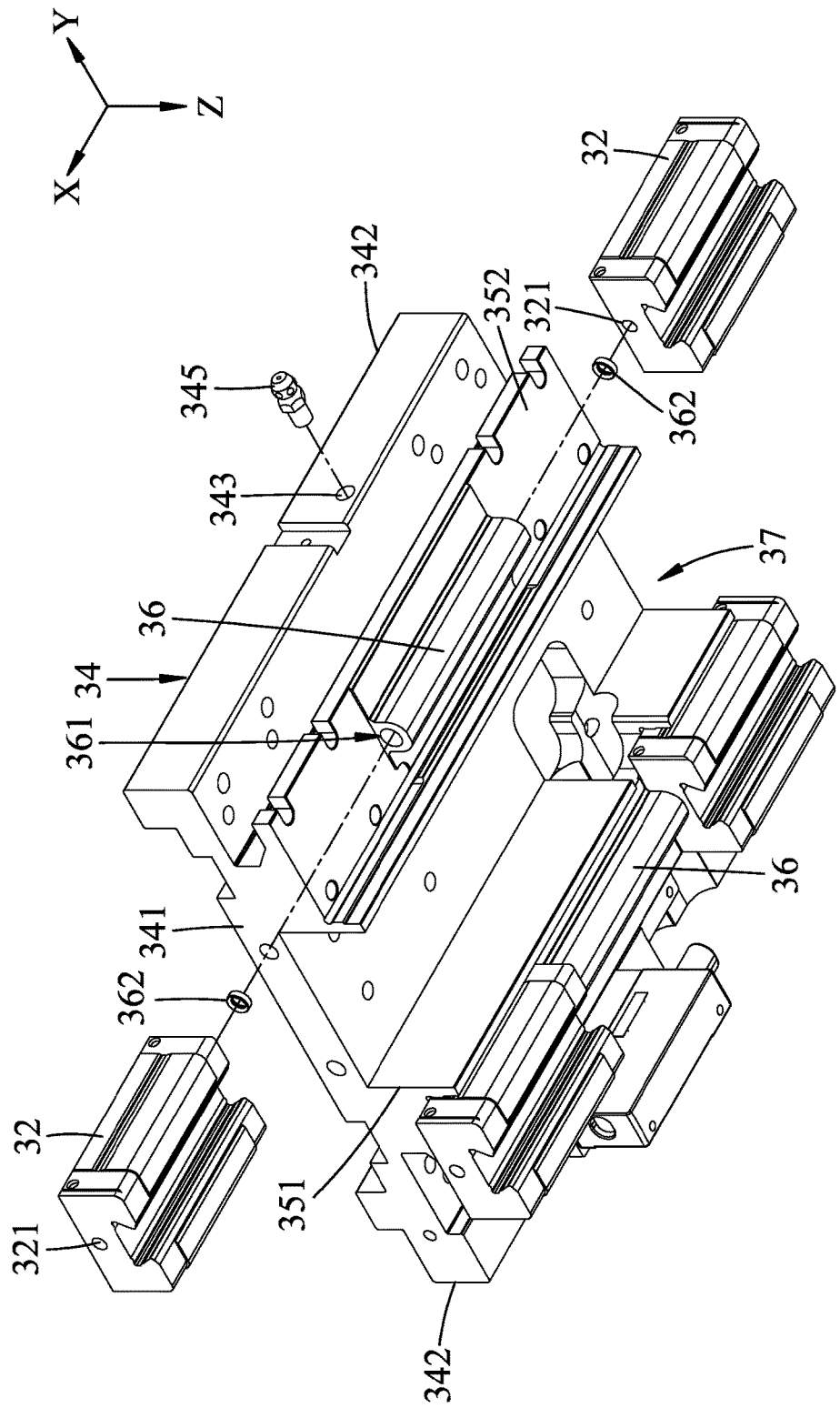
FIG. 4 is an exploded perspective view of a sliding seat and two pairs of sliding blocks of the sliding unit of the embodiment.

Further referring to FIG. 4, the sliding seat 33 includes a main body portion 34, two fixed portions 35 that extend downwardly from the main body portion 34 in a vertical direction (Z) perpendicular to the longitudinal direction (X) and the transverse direction (Y), and two guiding portions 36 that are respectively formed on the fixed portions 35. Each of the guiding portions 36 abuts against a respective pair of the sliding blocks 32. The main body portion 34 and the fixed portions 35 cooperatively define a receiving groove 37 that opens downwardly.

Figure 5:
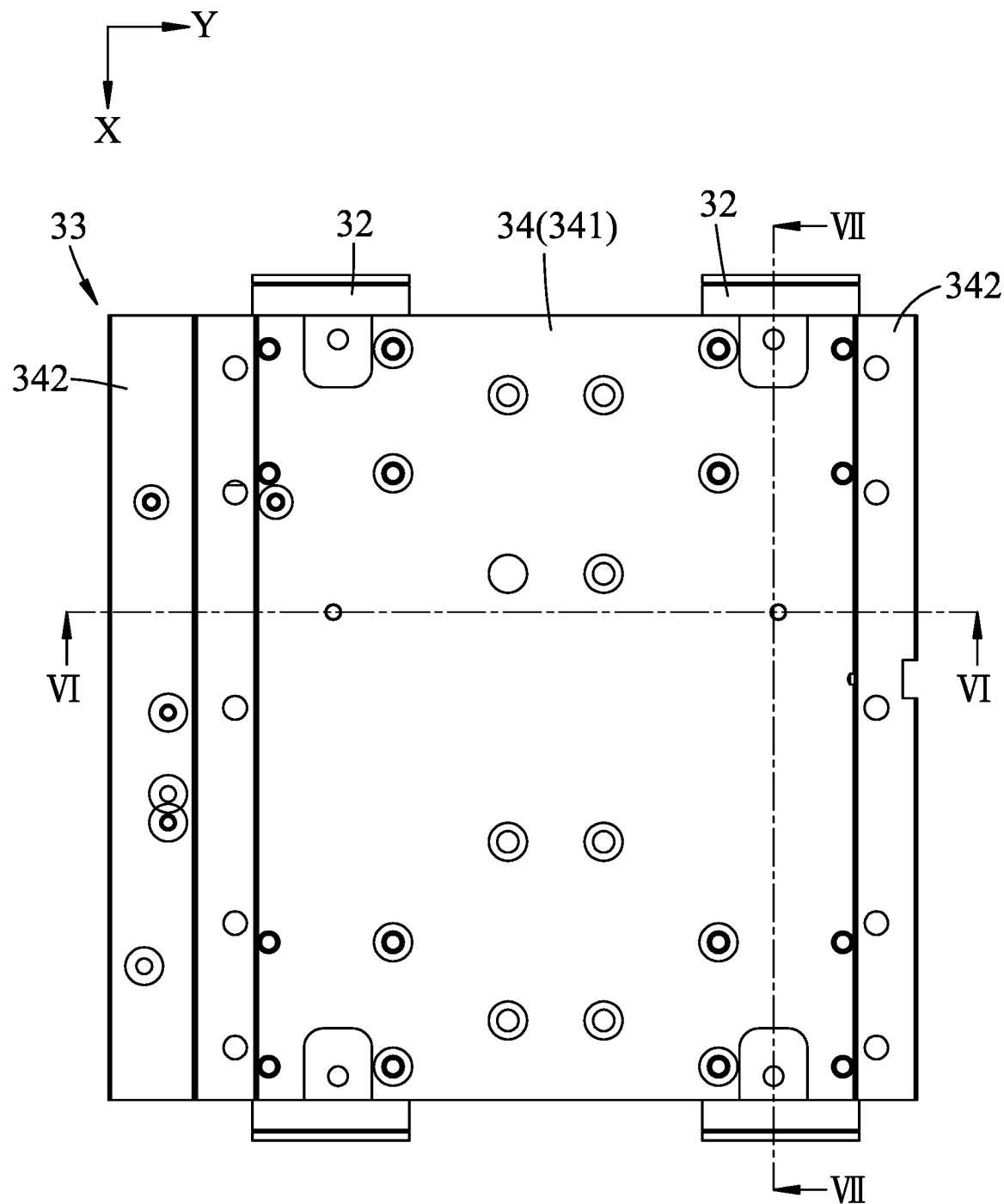
FIG. 5 is a top view of the sliding seat and the sliding blocks of the embodiment.
Figure 6:
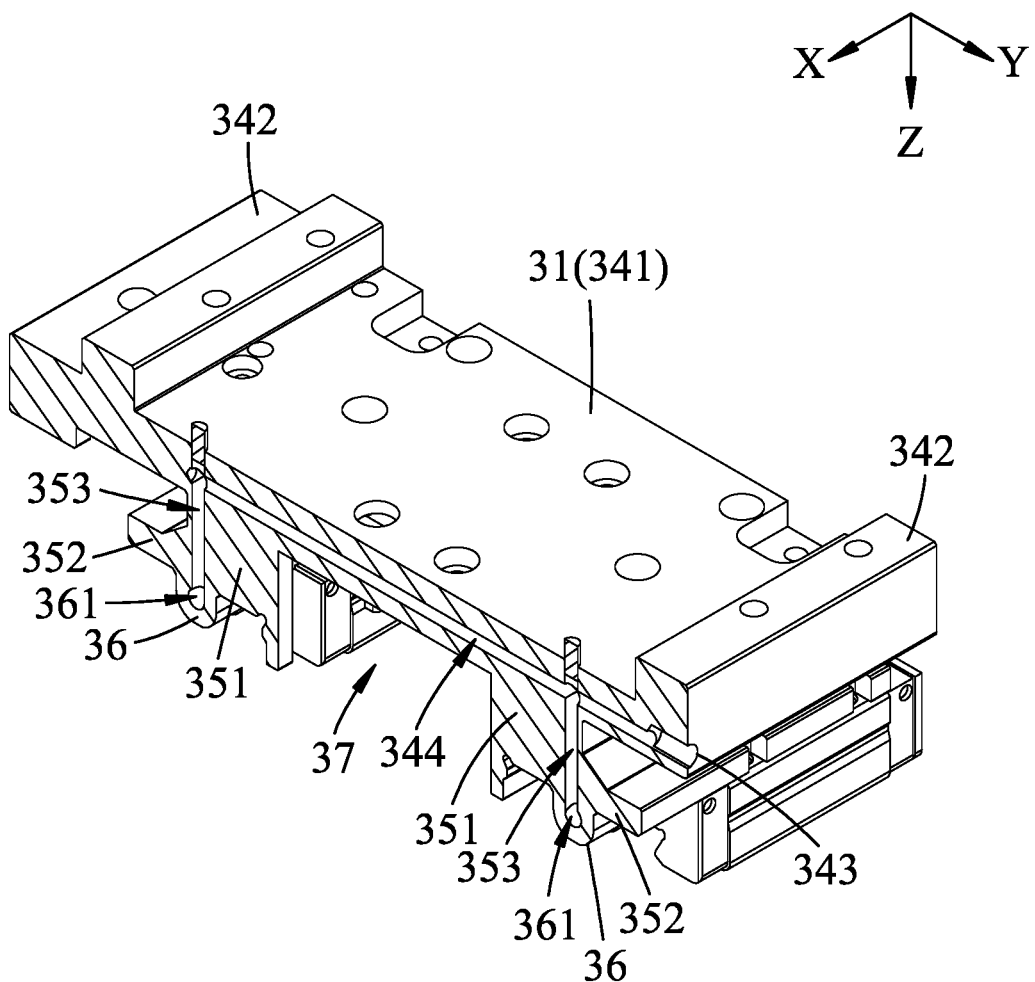
FIG. 6 is a cutaway perspective view taken along line VI-VI in FIG. 5.

Further referring to FIGS. 5 and 6, the main body portion 34 includes a covered section 341 that is covered by the cover plate 5 (see FIGS. 1 and 2) and that is connected between the fixed portions 35, two exposed sections 342 that are connected respectively to two sides of the covered section 341 opposite in the transverse direction (Y) and that are exposed outwardly of the cover plate 5, and a lubricant-feeding fitting 345. The main body portion 34 has a main flow passage 344 that is adapted to be in fluid communication with the external environment, and an insertion hole 343 that is formed in an outer surface of one of the exposed sections 342, that is not covered by the cover plate 5, and that is adapted for interconnecting the main flow passage 344 and the external environment. Specifically, the main flow passage 344 extends from the insertion hole 343 in the transverse direction (Y) through the covered section 341 toward the other one of the exposed sections 342. The lubricant-feeding fitting 345 is inserted into the insertion hole 343 for sealing the main flow passage 344 to prevent foreign objects or foreign matter such as dust from entering the main flow passage 344, and is operable for feeding lubricant therethrough into the main flow passage 344. In this embodiment, the lubricant-feeding fitting 345 is a grease fitting that is capable of allowing lubricant to flow therethrough without detaching the same from the insertion hole 343.

Figure 7:
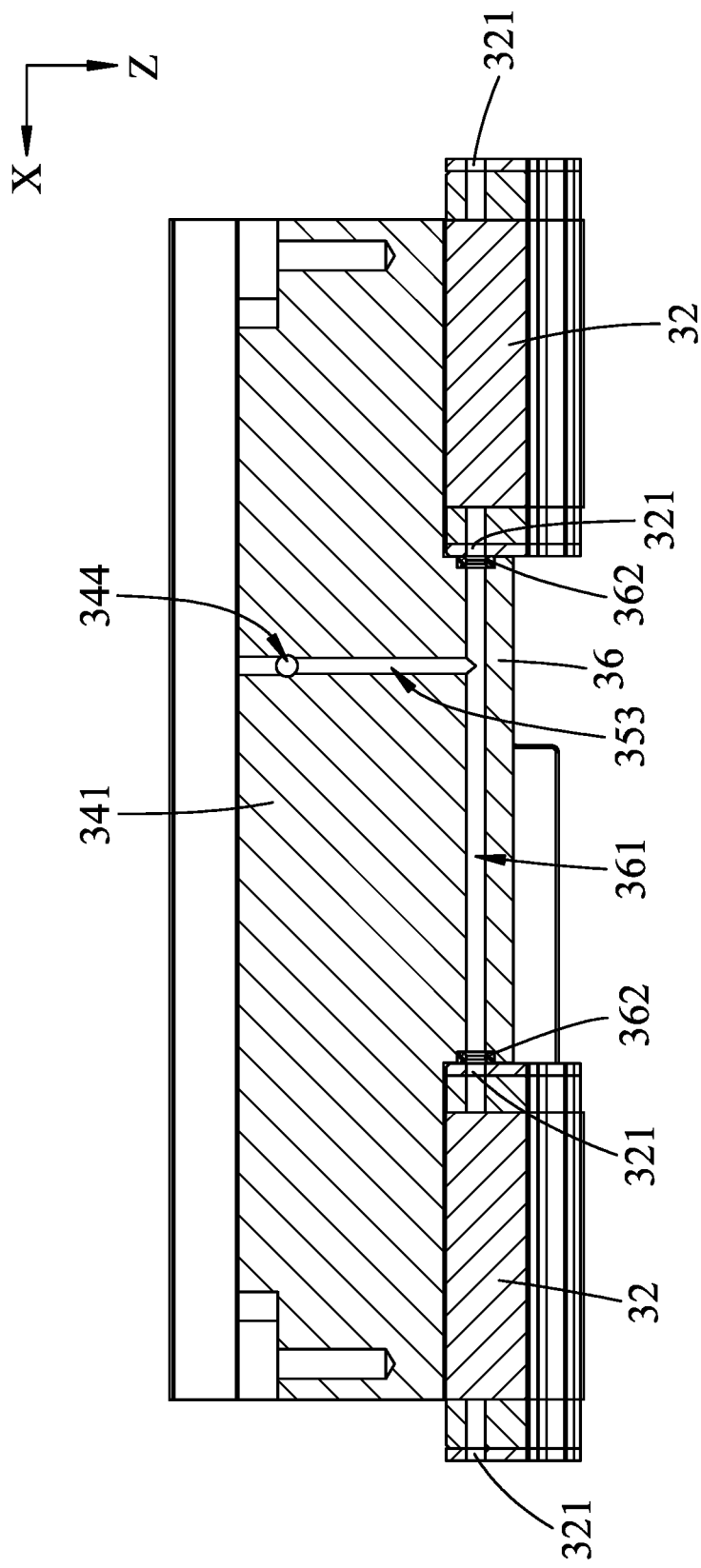
FIG. 7 is a sectional view taken along line VII-VII in FIG. 5.

Further referring to FIG. 7, the fixed portions 35 are connected to the lower side of the covered section 341 and are spaced apart from each other in the transverse direction (Y). Each of the fixed portions 35 includes a connecting section 351 that extends downwardly from the covered section 341, an abutment section 352 that extends from the connecting section 351 away from the other one of the fixed portions 35 along an axis that extends in the transverse direction (Y), and that is mounted to the corresponding pair of the sliding blocks 32. Each of the fixed portions 35 has a connecting passage 353 that extends through the connecting section 351 and the abutment section 352 in the vertical direction (Z) and that is in fluid communication with the main flow passage 344. The covered section 341 of the main body portion 34 and the connecting sections 351 of the fixed portions 35 cooperatively define the receiving groove 37 that opens downwardly.

As shown in FIGS. 4, 6, and 7, each of the guiding portions 36 is formed on a bottom surface of the abutment section 352 of the respective one of the fixed portions 35, is disposed between and abuts against the respective one pair of the sliding blocks 32, has a guiding passage 361 that extends along the longitudinal direction (X) and that is in fluid communication with the connecting passage 353 of the respective one of the fixed portions 35 and an adjacent one of the oil inlets 321 of each of the sliding blocks 32 of the respective one pair of the sliding blocks 32, and has two sealing members 362 that are disposed respectively on two opposite ends of the guiding passage 361 and that abut respectively against the respective one pair of the sliding blocks 32, i.e., each of the sealing members 362 is disposed between the respective one of the opposite ends of the guiding passage 361 and the adjacent one of the oil inlets 321 of the respective one of the sliding blocks 32 for preventing leakage therebetween. For each of the sliding blocks 32, one of the oil inlets 321 that does not abut against the guiding portions 36 may be sealed by a sealing member (not shown) to prevent leakage.

It should be noted that, as described above, each of the sliding blocks 32 has two oil inlets 321 formed at the two ends thereof that are opposite in the longitudinal direction (X) in this embodiment, but the present disclosure is not limited to this example. In other embodiments, each of the sliding blocks 32 may be formed with only one oil inlet 321 at one of the ends thereof that is adjacent to and abuts against the respective one of the guiding portions 36 so as to be in fluid communication with the guiding passage 361 of the respective one of the guiding portions 36.

Referring back to FIGS. 2 and 3, the linear motor unit 4 includes a stator module 41 that is disposed on the base unit 2, that extends in the longitudinal direction (X), and that is located between the rails 31, and a mover 42 that is mounted in the receiving groove 37 and that is connected fixedly to the covered section 341 of the main body portion 34 of the sliding seat 33. When the stator module 41 is energized, the mover 42 moves relative to the stator module 41 so the sliding seat 33 co-moves therewith and the sliding blocks 32 are driven to slide along the rails 31.

As shown in FIGS. 1 and 2, the cover plate 5 extends in the longitudinal direction (X), is disposed above and covers the base unit 2, and covers the covered section 341 of the main body portion 34. The exposed sections 342 of the main body portion 34 are not covered by the cover plate 5. The insertion hole 343 is formed in the outer surface of one of the exposed sections 342 and is also not covered by the cover plate 5. In this way, an operator may inject lubricant such as lubricant oil into the main flow passage 344 through the insertion hole 343 without removing the cover plate 5 and the lubricant-feeding fitting 345.

Specifically, as shown in FIGS. 3, 6 and 7, when daily maintenance of the sliding table device 1 is to be performed and the rolling members mounted in the sliding blocks 32 are to be lubricated, an oil gun (not shown) is brought to be coupled to the lubricant-feeding fittings 345 to inject lubricant into the main flow passage 344 through the insertion hole 343. The lubricant injected into the main flow passage 344 flows downwardly into the connecting passages 353 when passing by intersections of the main flow passage 344 and the connecting passages 353. Then, the lubricant flows into the guiding passages 361, and finally flows through the oil inlets 321 into the sliding blocks 32 to lubricate the rolling members mounted therein so that the daily maintenance is completed.

In summary, by virtue of the insertion hole 343 that is formed in one of the exposed sections 342, which are not covered by the cover plate 5, it is not required to remove the cover plate 5 from the sliding blocks 32 for daily maintenance of the sliding table device 1 of the present disclosure. Furthermore, the rolling members may be lubricated by simply bringing the oil gun to be coupled to the lubricant-feeding fittings 345 so that lubricant may flow sequentially through the insertion hole 343, the main flow passage 344, the connecting passages 353, the guiding passages 361 and the oil inlets 321 into the sliding blocks 32 to lubricate the rolling members mounted in the sliding blocks 32. There is no need to lubricate the sliding blocks 32 one by one. Thus, daily maintenance of the sliding table device 1 becomes relatively simple.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A sliding table device comprising:
    a base unit extending in a longitudinal direction;
    a sliding unit including
        two rails that extend in the longitudinal direction, that are disposed on said base unit, and that are spaced apart from each other in a transverse direction perpendicular to the longitudinal direction,
        two sliding blocks that are disposed respectively and slidably on said rails, each of said sliding blocks having at least one oil inlet, and
        a sliding seat that is mounted co-movably on said sliding blocks and that includes
            a main body portion having a main flow passage that is adapted to be in fluid communication with external environment,
            two fixed portions extending downwardly from said main body portion and mounted respectively to said sliding blocks, each of said fixed portions having a connecting passage that is in fluid communication with said main flow passage, and
            two guiding portions formed respectively on said fixed portions and abutting respectively against said sliding blocks, each of said guiding portions having a guiding passage that is in fluid communication with said connecting passage of the respective one of said fixed portions and said at least one oil inlet of the respective one of said sliding blocks; and
    a cover plate extending in the longitudinal direction, disposed above said base unit, and covering a portion of said main body portion, said main body portion further having an insertion hole that is formed in an outer surface of thereof, that is not covered by said cover plate, and that is adapted for interconnecting said main flow passage and the external environment.

2. The sliding table device 1 as claimed in claim 1, wherein:
    said main body portion includes
        a covered section covered by said cover plate and connected between said fixed portions, and
        two exposed sections connected respectively to two sides of said covered section that are opposite in the transverse direction, and exposed outwardly of said cover plate;
    said insertion hole is formed in one of said exposed sections;
    said main flow passage extends from said insertion hole in the transverse direction through said covered section toward the other one of said exposed sections;
    said connecting passage of each of said fixed portions extends in a vertical direction perpendicular to the longitudinal direction and the transverse direction, and is in fluid communication with said main flow passage; and
    said guiding passage of each of said guiding portions extends in the longitudinal direction.

3. The sliding table device of claim 2, wherein said main body portion further includes a lubricant-feeding fitting inserted into said insertion hole for sealing said main flow passage and operable for feeding lubricant therethrough into said main flow passage.

4. The sliding table device of claim 2, wherein:
    each of said fixed portions includes
        a connecting section extending downwardly from said covered section, and
        an abutment section extending from said connecting section away from the other one of said fixed portions along an axis that extends in the transverse direction and mounted to the respective one of said sliding blocks; and each of said guiding portions is formed on a bottom surface of said abutment section of the respective one of said fixed portions.

5. The sliding table device of claim 4, wherein:
said covered section of said main body portion and said connecting sections of said fixed portions cooperatively define a receiving groove that opens downwardly; and
said sliding table device further comprises a linear motor unit that includes
  a stator module that is disposed on said base unit, that extends in the longitudinal direction, and that is located between said rails, and
  a mover that is mounted in said receiving groove and that is connected fixedly to said covered section.

6. The sliding table device of claim 1, wherein each of said guiding portions further has at least one sealing member disposed between said guiding passage and said at least one oil inlet of the respective one of said sliding blocks for preventing leakage therebetween.

7. The sliding table device of claim 1, wherein said base unit includes:
  a base body;
  two end seats disposed respectively at two ends of said base body that are opposite in the longitudinal direction; and
  two buffering modules mounted to said base body and disposed respectively adjacent to said end seats for buffering collision encountered by said sliding seat during movement of said sliding seat along said rails.

\* \* \* \* \*